United States Patent [19]

Hoki et al.

[11] 4,331,777
[45] May 25, 1982

[54] FOAMING SYNTHETIC RESIN COMPOSITIONS STABILIZED WITH CERTAIN NAPHTHYL AMINE COMPOUNDS

[75] Inventors: Tsuneo Hoki; Minoru Hisamatsu, both of Suzuka, Japan

[73] Assignee: Asahi-Dow Limited, Tokyo, Japan

[21] Appl. No.: 241,270

[22] Filed: Mar. 6, 1981

[30] Foreign Application Priority Data

Mar. 12, 1980 [JP] Japan .................................. 55-30239

[51] Int. Cl.$^3$ .............................................. C08J 9/14
[52] U.S. Cl. ...................................... 521/94; 521/79; 521/143; 521/149
[58] Field of Search .................. 260/45.9 QB; 521/94, 521/143, 144, 149, 79

[56] References Cited

U.S. PATENT DOCUMENTS

| | | | |
|---|---|---|---|
| 2,448,799 | 9/1948 | Happoldt, Jr. et al. | 260/45.9 QB |
| 2,543,329 | 2/1951 | Myers | 260/45.9 QB |
| 2,727,879 | 12/1955 | Vincent | 260/45.9 QB |
| 3,017,371 | 1/1962 | Hohenberg et al. | 521/79 |
| 3,645,930 | 2/1972 | Normanton | 521/139 |
| 3,645,931 | 2/1972 | Normanton | 521/143 |

*Primary Examiner*—Morton Foelak

[57] ABSTRACT

Substantially closed-cell aliphatic olefin polymer foams having improved dimensional stability are provided by the inclusion therein of from 0.1 to 10 weight percent, based upon the olefin polymer, of certain naphthyl amine compounds.

7 Claims, 2 Drawing Figures

4,331,777

FOAMING SYNTHETIC RESIN COMPOSITIONS STABILIZED WITH CERTAIN NAPHTHYL AMINE COMPOUNDS

BACKGROUND OF THE INVENTION

The present invention relates to the foaming or expansion of a synthetic resin composition and, more particularly, to foaming processes, foamable compositions and foamed articles involving an aliphatic olefin polymer, a blowing agent and from 0.1 to 10 percent by weight, based on said aliphatic olefin polymer, of at least one compound effective to suppress the escape of the blowing agent gas from the expanded foam, with a resultant improvement in the gas efficiency of the blowing agent together with a substantial reduction in shrinkage of the expanded foam.

Generally, thermoplastic synthetic resin foam is produced by adding a blowing agent to the resin and by heating the resultant resin/blowing agent mixture to gasify the blowing agent for expanding the resin. Improvement in the efficiency of such blowing agent is significant for commercial-scale production of synthetic thermoplastic resin foams.

Among thermoplastic resins, aliphatic olefin polymer resins are particularly difficult to expand directly in a commercial-scale process. This has been attributed to the high degree of temperature dependence of their thermo-rheological viscoelasticity in the molten state and the relatively high permeability of their foam cell membranes to blowing agent gases. Further complications arise from the latent heats of thermal expansion and crystallization which may occur during the foaming process. Commonly, especially for expansion ratios of five or more, aliphatic olefin polymers are modified prior to expansion by crosslinking or blending with other resin or resins.

As an alternative approach, Japanese Patent Publication No. 35(1960)-4,341 discloses extrusion-foaming of a non-crosslinked polyolefin resin using such a relatively expensive blowing agent as 1,2-dichlorotetrafluoroethane. However, the resulting foam product often undergoes a gradual shrinkage and a density change and has a poor surface appearance. Improved quality and dimensional control of olefin polymer foams are thus still desirable.

More recently, a variety of chemical additives have been discovered which improve the quality and dimensional stability of olefin polymer foams without the necessity of crosslinking and/or resin blending techniques while permitting the satisfactory utilization of less expensive volatile organic blowing agents in place of 1,2-dichlorotetrafluoroethane. More specifically, such additives include saturated higher fatty acid amides, saturated higher fatty acid amines and complete esters of saturated fatty acids as disclosed in Watanabe et al. U.S. Pat. No. 4,214,054; partial esters of long chain fatty acids as disclosed in Cronin U.S. Pat. No. 3,644,230 and in Ehrenfreund U.S. Pat. No. 3,755,208; partial and complete esters of aliphatic fatty acids as disclosed in Korori U.S. Pat. No. 4,217,319; and the related technology of Japanese Kakoi Nos. 53-102,971; 54-34,374; and 54-39,476.

The present invention provides another group of chemical additives which improve the dimensional stability of aliphatic olefin polymer foams. More specifically, the present invention provides a foamable olefin polymer composition which is easily expanded using commonly available inexpensive blowing agents to give a substantially closed-cell foam product exhibiting reduced shrinkage and improved dimensional stability and surface smoothness.

SUMMARY OF THE INVENTION

In accordance with the present invention such a foamable olefin polymer composition comprises a major proportion by weight of a normally solid aliphatic olefin polymer, a volatile organic blowing agent and from 0.1 to 10 weight percent, based upon such olefin polymer, of a napthyl amine compound represented by the following formula I:

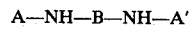

$$A-NH-B-NH-A' \qquad (I)$$

wherein A and A', which may be the same or different, each represent α- or β-naphthyl group and B represents a radical selected from a group consisting of p- and m-phenylene groups, a p,p'-diphenylene group, and a m,m'-diphenylene group.

These foamable aliphatic olefin polymer compositions are particularly advantageous in the sense that, even when non-crosslinked olefin polymers and readily available, relatively inexpensive volatile organic blowing agents are employed, the resulting foamable compositions nonetheless provide good quality substantially closed-cell aliphatic olefin polymer foams having improved dimensional stability. The availability of this different type of stabilizer additive provides greater operating flexibility to foam manufacturing operations.

DETAILED DESCRIPTION OF THE INVENTION

Figure 1:
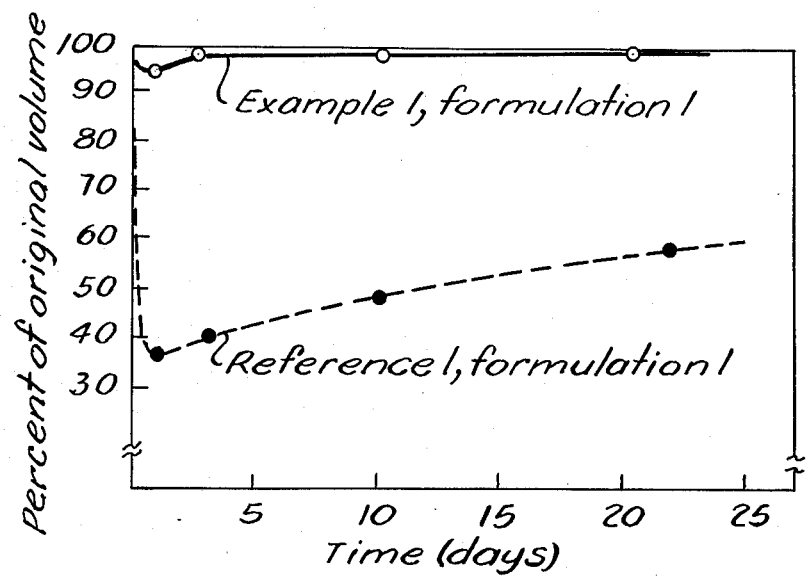
FIG. 1 is a graph showing foam volume in percent based upon initial foam volume as a function of time for foam formed from Formulation 1 in Example 1 and from Formulation 1 in Reference 1 of the accompanying working examples.

Typical examples of the compounds represented by the foregoing formula I include:
N,N'-di-β-naphthyl-paraphenylenediamine;
N,N'-di-β-naphthyl-metaphenylenediamine;
N,N'-di-β-naphthyl-paradiphehylenediamine;
N,N'-di-α-naphthyl-paraphenylenediamine;
N,N'-di-α-naphthyl-metaphenylenediamine; and
N,N'-di-α-naphthyl-paradiphenylenediamine.
These compounds may be used as mixtures thereof.

According to the present invention, the foamable resin composition should contain at least 0.1 percent by weight, based on the aliphatic olefin polymer, of at least one compound represented by the formula I, with the total content thereof falling in the range of 0.1 to 10 percent by weight when two or more such compounds are used. The amount of compound or compounds added may be selected within this range depending on the types of polymer and blowing agent used as well as on the shape, physical and mechanical properties of the intended foam. Generally, it is preferable that the total amount of the formula I compound employed be in the range of 0.3 to 7 percent by weight. If the content of the formula I compound is smaller than 0.1 percent by weight, the reultant foam will generally have inferior properties. On the other hand, using more than 10 percent by weight of the formula I compound generally give no further improvement and may show undesirable plasticizing action.

The aliphatic olefin polymers herein referred to are normally solid polymers predominantly composed of olefins, including low-density polyethylene, medium-density polyethylene, high-density polyethylene, isotactic polypropylene and poly-1-butene and such copolymers of ethylene or propylene and other monomers copolymerizable therewith as propylene-(1-octene)-ethylene copolymer, ethylene-propylene copolymer, ethylene-vinyl acetate copolymer, ethylene-acrylic acid copolymer, ethylene-ethyl acrylate copolymer and ethylene-vinyl chloride copolymer as well as zinc, sodium, calcium and magnesium salts of ethylene-acrylic acid copolymer. These aliphatic olefin polymers may be used individually or as mixtures of two or more.

For mixing the formula I compound(s) of the present invention with the aliphatic olefin polymer to be employed, such components may be admixed and kneaded by any suitable conventional means such as single-screw extruder, twin-screw extruder, compounding rolls, and Banbury mixer. In any case, a preliminary blend of the formula I compound(s) and the olefin polymer may be prepared as a dryblend or masterbatch, or the formula I compound may be mixed with the olefin polymer in molten or heat plastified form just before expansion.

The foamable olefin polymer composition of the present invention may be expanded into a foam by conventional methods. Thus, for example, conventional extrusion foaming techniques can be employed in which an admixture of the olefin polymer and the formula I compound(s) of the present invention is continuously heated and/or worked to be melted or heat plastified and a volatile organic blowing agent is added thereto at an elevated temperature under high pressure. Then, the resultant molten or heat plastified mixture is extruded into a lower-pressure zone to be expanded into a foam. Alternatively, a batch method may be used, in which the volatile organic blowing agent is added at elevated temperature under high pressure to a molten composition comprising the olefin polymer and the formula I compound and, then, pressure is removed from the molten mixture system. Also the olefin polymer/formula I compound composition can be crosslinked with electron beams or a chemical crosslinking agent if desired before expansion. However, the present invention is particularly effective when applied to extrusion-expansion of olefin polymer compositions and especially when such compositions are to be expanded to five or more times their original, unexpanded volume.

Any conventional volatile organic blowing agents may be used as desired. However, especially preferable for use in the present invention are those volatile organic blowing agents that have boiling points lower than the melting point of the aliphatic olefin polymer employed. Typical examples of such preferable blowing agents include propane, butane, pentane, pentene, hexane, hexene, heptane and octane. Also usable as the blowing agents are such halogenated hydrocarbons meeting the foregoing limitation on the boiling points as methylene chloride, trichlorofluoromethane, dichlorofluoromethane, chlorodifluoromethane, chlorotrifluoromethane, dichlorodifluoromethane, 1,1-dichloroethane, 1-chloro-1,1-difluoroethane, 1,8-dichlorotetrafluoroethane, chloropentafluoroethane and the like, including mixtures thereof. In addition to such volatile organic blowing agents, known chemical blowing agents such as azodicarboniamide, azobisisobutyronitrile, dinitrosopentamethylenetetramine, p-toluenesulfonyl hydrazide and the like can also be optionally employed in conjunction the aforementioned volatile organic blowing agents.

The expandable or foamable olefin polymer composition according to the present invention may contain minor amounts of lubricating and nucleating agents such as zinc stearate or similar metal soaps and finely-ground calcium silicate or the like inorganic materials. Also, the resin composition of the present invention may contain an ultraviolet light absorber, antistatic agent, stabilizer, colorant and/or lubricating agent other than the foregoing in a total amount not exceeding 5 percent by weight.

The foamable aliphatic olefin polymer compositions according to the present invention may be expanded into almost any shapes including sheets, blocks, rods and pipes, or it may be used for electric wire and cable coverings or sheathings or as a variety of other formed foam articles.

The present invention is further illustrated by the following examples and the accompanying comparative or reference experiments. In such examples and comparative (or reference) experiments, the effects of the present invention were evaluated in terms of the hereinafter described properties and parameters. Also, in such examples and experiments, all parts and percentages are given on a weight basis unless otherwise specified.

1. Compressive strength and compressive strength coefficient:

(a) The 25% compressive strength (in kg/cm$^2$) was measured according to JIS-K-6767.

(b) The compressive strength coefficient (A) was determined by applying the 25% compressive strength (P) to the following formula:

$$A = P/D^{1.428} \cdot Y$$

wherein

D = bulk density of foam (kg/cm$^3$); and
Y = $(1 - (\alpha/100))$, with $\alpha$ representing the comonomer content, if any (wt. %) of the olefin polymer employed.

2. The 50% compression permanent set was measured in accordance with JIS-K-6767.

3. The compressive creep was measured in accordance with JIS-K-6767 (static load: 0.1 kg/cm$^2$, 24 hrs).

4. Surface smoothness:

For evaluating the surface smoothness of a foam, the coarseness of the specimen was measured over a 10 cm length on its surface by means of a coarseness meter which detects and counts rippling creases or concavo-convexes not smaller than 0.5 mm in their amplitudes, and the count was converted into a value per 1 cm in length.

5. Feedability through extruder:

Each resin composition was extruded through an extruder of 30 mm in its barrel diameter and the throughput per minute was measured to determine its percentage variation by the following formula:

$$\text{Percentage variation in throughput} = \frac{\text{maximum throughput} - \text{minimum throughput}}{\text{average throughput}} \times 100$$

6. Maximum shrinkage:

The volume of each expanded foam specimen was measured by the water-immersion method within one minute after expansion and t days thereafter, respectively, and the measurements were applied to the following formula to determine the percentage shrinkage:

Percentage shrinkage $= (V_O - V_t)/V_O \times 100$ $V_O$: volume measured within one minute after expansion $V_t$: volume measured t days after expansion The maximum percentage shrinkage was used as a measure of foam specimen evaluation.

7. Dimensional stability:

The dimensional stability was calculated by applying the measurements of the preceding Paragraph 6 to the following formula:

Dimensional stability $= V_0 - V_{20}$ wherein $V_{20}$ is the volume of the foam specimen measured 20 days after expansion.

8. Water absorption ratio:

The volume (V) and weight ($W_0$) of a foam specimen about 100 mm×100 mm×25 mm) were accurately measured, and the foam specimen was immersed in water contained in a vacuum chamber with its top placed at a depth of 5 cm below the surface. Then, after reducing the internal pressure of the chamber to 460 mm Hg, the specimen was left to stand in the water for 10 minutes. Thereafter, the internal pressure of the chamber was restored to the atmospheric pressure, and the specimen was taken out from the chamber and immersed in methanol having the purity of 95% or more for 2 seconds. After air drying the thus treated specimen for 5 minutes at 60° C., its weight ($W_1$) was accurately measured. The measurements $W_0$, $W_1$ and V were applied to the following formula to determine the closed cellular characteristic value:

Water absorption ratio (g/cm$^3$) $= (W_1 - W_0)/V$

9. Overall evaluation:

Each evaluation item was applied to each specimen in accordance with the following schedule:

For overall evaluation, all of the foregoing evaluation items 1 through 8 were taken into consideration in a combined manner as follows:

| E (Excellent) | Specimens having at least two excellent marks (a) and no passable (c) or bad (d) marks. |
|---|---|
| G (Good) | Specimens having at least one good mark (b) with one or two passable marks (c) and without any bad marks (d). |
| F (Fair) | Specimens having at least three passable marks (c) without any bad marks (d). |
| P (Poor) | Specimens having at least one bad mark (d). |

In the following examples and reference experiments, the following aliphatic olefin polymers, volatile organic blowing agents and additives were used.

ALIPHATIC OLEFIN POLYMERS

Resin A: Low-Density polyethylene produced by Asahi-Dow Limited, with density of 0.919 g/cm$^3$ and MI of 2.0 g/10 minutes.

Resin B: Ethylene-vinyl acetate (EVA) copolymer produced by Sumitomo Chemical Co., Ltd., with vinyl acetate content of 10%, density of 0.93 g/cm$^3$ and MI of 1.5 g/10 minutes.

Resin C: Ethylene-vinyl acetate copolymer produced by Sumitomo Chemical Co., Ltd., with vinyl acetate content of 25%, density of 0.95 g/cm$^3$ and MI of 1.5 g/10 minutes.

VOLATILE ORGANIC BLOWING AGENTS

Agent D: Dichlorodifluoromethane

Agent E: 2-chloro-1,1-difluoroethane

Agent F: 1,2-dichlorotetrafluoroethane

Agent G: A mixture of 75% of 1,2-dichlorotetrafluoroethane and 25% monochloropentafluoroethane

ADDITIVES

I: N,N'-di-β-naphthyl-paraphenylenediamine
II: N,N'-di-β-naphthyl-paradiphenylenediamine
III: N-β-naphthyl-aniline

| | Evaluation | | | |
|---|---|---|---|---|
| Evaluation Item | a (Excellent) | b (Good) | c (Passable) | d (Bad) |
| 1. Compressive strength coefficient | $8.0 \times 10^{-3}$ or more | $4.0 \times 10^{-3}$ or more, but less than $8.0 \times 10^{-3}$ | $2.15 \times 10^{-3}$ or more, but less than $4.0 \times 10^{-3}$ | Less than $2.15 \times 10^{-3}$ |
| 2. 50% Compression permanent set (%) | From 0 to less than 5 | 5 to less than 15 | 15 to less than 30 | 30 or more |
| 3. Compressive creep (%) | From 0 to less than 5 | 5 to less than 10 | 10 to less than 20 | 20 or more |
| 4. Surface smoothness (number/cm) | From 0 to less than 3 | 3 to less than 6 | 6 to less than 10 | 10 or more |
| 5. Feedability through extruder (%) | From 1 to less than 5 | 5 to less than 10 | 10 to less than 15 | 15 or more |
| 6. Maximum shrinkage (%) | From 0 to less than 10 | 10 to less than 15 | 15 to less than 20 | 20 or more |
| 7. Dimensional stability (%) | From 0 to less than 5 | 5 to less than 10 | 10 to less than 15 | 15 or more |
| 8. Water absorption ratio (g/cm$^3$) | From 0 to less than 0.010 | From 0.010 to less than 0.025 | From 0.025 to less than 0.050 | 0.50 or more |

EXAMPLE 1 AND REFERENCE EXPERIMENT 1

100 Parts of the aliphatic olefin polymer A, B, or C, the additive I or II in an amount shown in Table 1, 0.1 part of calcium stearate and 0.6 part of calcium silicate as nucleators and 22 parts of the blowing agent D, E, F, or G were fed into a 30 mm inside barrel diameter single-screw extruder, the barrel being heated to 190° C., provided with a die having a round aperture of 5 mm diameter. Each of the resultant polymer compositions was melted and kneaded in the extruder and was extruded through the die to be expanded into a foam. During the extrusion, the polymer composition temperature was controlled to 105° C. within the die. The resultant foam was subjected to evaluation in terms of the aforementioned evaluation items, the results of which are shown in Table 1.

As Reference Experiment 1, the same procedure and conditions as those used in Example 1 were repeated, except that either no additive was used or the additive III was used in place of additives I and II and except that the base resin C was not used. Like Example 1, each foam obtained in Reference Experiment 1 was evaluated in terms of the aforementioned items and the results of such evaluations are also shown in Table 1.

Figure 2:
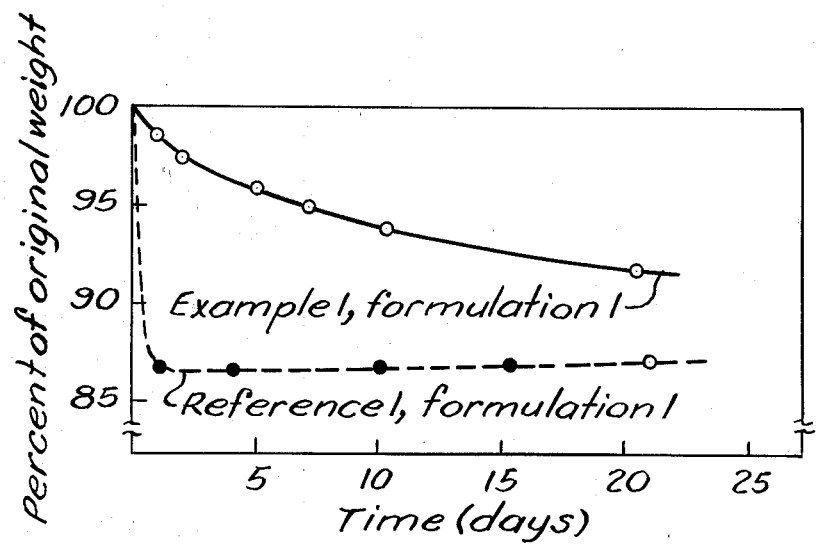
FIG. 2 is a graph showing foam weight in percent based upon initial foam weight as a function of time for foam formed from the same Formulations.

FIGS. 1 and 2 shown changes in the volume and weight of the foam specimens of formulation 1 in Example 1 and of formulation 1 in Reference 1 as a function of time after expansion.

As can be clearly seen from FIG. 1, the additive of formulation 1 in Example 1 is highly effective to prevent shrinkage of the formulation 1, Example 1 foam product.

TABLE 1

| | Base Resin | Additive (part) | Blowing Agent | Density | 1 | 2 | 3 | 4 | 5 | 6 | 7 | 8 |
|---|---|---|---|---|---|---|---|---|---|---|---|---|
| Example 1 [+] | | | | | | | | | | | | |
| Formulation 1 | A | I 0.5 | D | 0.030 | a | a | a | a | a | a | a | a |
| Formulation 2 | A | I 1.5 | E | 0.032 | a | b | b | b | a | b | a | a |
| Formulation 3 | A | I 4.0 | F | 0.034 | a | b | b | b | b | b | a | a |
| Formulation 4 | B | I 1.0 | D | 0.029 | a | b | b | a | a | a | a | a |
| Formulation 5 | C | II 1.5 | D | 0.031 | a | b | b | a | a | a | a | a |
| Formulation 6 | C | II 2.5 | E | 0.033 | a | b | b | a | b | b | a | a |
| Formulation 7 | C | II 1.0 | G | 0.037 | a | b | b | a | a | a | a | a |
| Reference 1 [+] | | | | | | | | | | | | |
| Formulation 1* | A | None | D | 0.040 | c | b | b | d | a | d | b | a |
| Formulation 2* | A | III 2.0 | D | 0.040 | c | b | b | d | a | d | b | a |
| Formulation 3* | B | None | D | 0.080 | c | c | d | d | a | d | b | b |
| Formulation 4* | B | None | G | 0.088 | d | d | d | d | a | d | d | b |

[+] The overall evaluation of Example 1, Formulations 1–7 was excellent and of Reference 1, Formulations 1–4 was poor.
*Not an example of the invention.

Evaluation Item
1 - Compressive strength coefficient;
2 - 50% compression permanent set;
3 - Compressive creep;
4 - Surface smoothness;
5 - feedability through extruder;
6 - Maximum shrinkage;
7 - Dimensional stability; and
8 - Water Absorption ratio.

EXAMPLE 2 AND REFERENCE 2

As Example 2, the same procedure and conditions as those used in Example 1 were repeated by using the olefin polymer resin B, additive I and blowing agent D as used in the formulation 4 of Example 1, except that the amounts of the additive I and blowing agent D were changed as shown in Table 1. In Reference Experiment 2, the same procedure and conditions as those used in Reference 1, were repeated, without additive, by using the olefin polymer resin B and blowing agent D as used in the formulation 3 of Reference 1, except that the amount of the blowing agent was changed as shown in Table 2. Like Example 1, the resultant foams of Example 2 and Reference Experiment 2 were subjected to evaluation, the results of which are summarized in Table 2.

TABLE 2

| | Base Resin | Additive (part) | Blowing Agent (part) | Density | 1 | 2 | 3 | 4 | 5 | 6 | 7 | 8 |
|---|---|---|---|---|---|---|---|---|---|---|---|---|
| Example 2 | | | | | | | | | | | | |
| Formulation 1 | B | I 4. | 60 | 0.014 | a | b | b | a | b | a | a | b |
| Formulation 2 | B | I 2. | 9 | 0.077 | a | b | b | a | a | a | a | a |
| Formulation 3 | B | I 1. | 5 | 0.174 | a | a | a | a | a | a | a | a |
| Reference 2 | | | | | | | | | | | | |
| Formulation 1* | B | None | 60 | 0.080 | d | d | d | d | a | d | d | b |
| Formulation 2* | B | None | 9 | 0.089 | c | c | d | d | a | d | b | b |

TABLE 2-continued

| | Base Resin | Additive (part) | Blowing Agent (part) | Density | \multicolumn{8}{c}{Evaluation Items} |
| | | | | | 1 | 2 | 3 | 4 | 5 | 6 | 7 | 8 |
|---|---|---|---|---|---|---|---|---|---|---|---|---|
| Formulation 3* | B | None | 5 | 0.195 | b | c | c | c | a | d | c | d |

*Not an example of the invention.
Evaluation Item
1 - Compressive strength coefficient;
2 - 50% compression permanent set;
3 - Compressive creep;
4 - Surface smoothness;
5 - feedability through extruder;
6 - Maximum shrinkage;
7 - Dimensional stability; and
8 - Water Absorption ratio.

EXAMPLE 3

The olefin polymer resin A was mixed and kneaded with 0.3 percent dicumyl peroxide as a cross-linking agent and 1.5 percent of the additive I to obtain a cross-linked polyethylene resin (in the form of beads having an average diameter of about 1.2 mm) having a gel ratio of about 60 percent. The beads were impregnated, in a pressure vessel, with dichlorodifluoromethane under increased pressure and heat and then cooled to obtain expandable crosslinked polyethylene beads containing 14 percent of dichlorodifluoromethane. The resulting expandable beads were then heated by steaming with 0.23 kg/cm$^2$G (22.6 kPa) steam for 45 sec. and the resultant primary expanded beads had a substantially uniform density distribution of about 90 kg/m$^3$. Thereafter, the primary expanded beads were heated in a pressure vessel at 80° C. for 15 hours while being pressurized by compressed air of 10 kg/cm$^2$G (981 kPa). Then, steam of 0.32 kg/cm$^2$G (31.4 kPa) was blown over the beads to give secondary expanded beads having a density of 25 kg/m$^3$.

The resultant secondary expanded beads, as pressurized by compressed air of 1.5 kg/cm$^2$G (147 kPa), were charged in a mold of a press molding maching (Model ECHO-120 manufactured by Toyo Machinery & Metal Co., Ltd.) and the mold was heated by steam of 1.2 kg/cm$^2$ (118 kPa) to obtain a molded article. The molded article had a density of 31 kg/m$^3$ and showed good fusion between beads. The water absorption ratio of the molded article was less than 0.01 g/cm$^3$.

REFERENCE 3

Except that the additive I was not used, the same procedure and conditions as those used in Example 3 were repeated to obtain the primary and secondary expanded beads;, which had densities of 110 kg/m$^3$ and 30 kg/m$^3$, respectively. These primary and secondary expanded beads showed a considerable shrinkage and were replete with surface wrinkles, as compared with those obtained in Example 3.

In addition, the blowing agent-impregnated expandable beads of Reference 3, had a useful life of only 20 minutes which was substantially shorter than that observed for the expandable beads of Example 3 (6 hours).

Further, the molded articles obtained in Reference 3 showed a higher water absorption ratio (0.015 gm/cm$^3$) as compared with Example 3, and its shock-absorbing properties and mechanical properties were significantly inferior to those achieved in Example 3.

What is claimed is:

1. A foamable synthetic resin composition comprising a normally solid aliphatic olefin polymer, a volatile organic blowing agent, and 0.1 to 10 percent by weight, based on said olefin polymer, of at least one compound selected from the group of compounds represented by the following formula I:

$$A-NH-B-NH-A' \qquad (I)$$

wherein A and A', which may be the same or different, each represent α- or β-naphthyl group and B represents a radical selected from a group consisting of p- and m-phenylene groups, a p,p'-diphenylene group, and a m,m'-diphenylene group.

2. The foamable resin composition of claim 1, wherein the aliphatic olefin polymer comprises polyethylene or an ethylene copolymer composed of ethylene as a major component and an olefin monomer or olefin monomers copolymerizable therewith.

3. The foamable synthetic resin composition of claim 1, wherein the formula I compound is N,N'-di-β-naphthyl-paraphenylenediamine or N,N'-di-β-naphthyl-paradiphenylenediamine.

4. The foamable synthetic resin composition of claim 1, wherein the aliphatic olefin polymer is low density polyethylene or an ethylene-vinyl acetate copolymer.

5. A substantially closed-cell foam article composed predominantly of an aliphatic olefin polymer composition having incorporated therein from 0.1 to 10 weight percent based upon such olefin polymer of a compound of the formula I:

$$A-NH-B-NH-A' \qquad (I)$$

wherein A and A', which may be the same or different, each represent alpha- or beta-naphthyl group and B represents a radical selected from a group consisting of p- and m-phenylene groups, a p,p'-diphenylene group, and a m,m'-diphenylene group; said article having been foamed using a volatile organic blowing agent.

6. The foam article of claim 5, wherein the aliphatic olefin polymer is a low density polyethylene or an ethylene-vinyl acetate copolymer.

7. The foam article of claim 5, wherein the formula I compound is N,N'-di-β-naphthyl-paraphenylenediamine or N,N'-di-β-naphthyl-paradiphenylenediamine.

* * * * *